(12) United States Patent
Sugihara et al.

(10) Patent No.: US 6,652,412 B2
(45) Date of Patent: Nov. 25, 2003

(54) SPEED CHANGE CONTROL SYSTEM OF TOROIDAL CONTINUOUSLY VARIABLE TRANSMISSION (75) Inventors: Jun Sugihara, Yokosuka (JP); Toshikazu Oshidari, Yokosuka (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/850,135

(22) Filed: May 8, 2001

(65) Prior Publication Data
US 2001/0046920 A1 Nov. 29, 2001

(30) Foreign Application Priority Data

May 15, 2000 (JP) ........................ 2000-141359
Mar. 8, 2001 (JP) ........................ 2001-064352

(51) Int. Cl.⁷ .............................................. F16H 15/38
(52) U.S. Cl. ............................................ 476/10; 476/40
(58) Field of Search .................................... 476/10, 40

(56) References Cited

U.S. PATENT DOCUMENTS 3,142,189 A * 7/1964 Davis et al. ................. 476/10
5,885,185 A 3/1999 Kidokoro et al. ............ 476/10
5,902,207 A * 5/1999 Sugihara ..................... 476/10
6,123,641 A 9/2000 Sugihara ..................... 476/10

FOREIGN PATENT DOCUMENTS

| DE | 199 30 375 A1 | 1/2000 |
| EP | 0 976 956 A1 | 2/2000 |
| JP | 7-198015 | 8/1995 |
| JP | 10-148244 | 6/1998 |

* cited by examiner

Primary Examiner—William C Joyce
(74) Attorney, Agent, or Firm—Foley & Lardner (57) ABSTRACT A speed change control system is equipped with a feedback mechanism which feeds back the gyration angle of a power roller and the axial displacement of the power roller, to a speed change control valve (100) via a speed change link (12). The feedback mechanism comprises a cam plate (2) which outputs a feedback amount according to the gyration angle of the power roller, an L-shaped link (7) which outputs a feedback amount according to the axial displacement of the power roller, and a feedback link (3) connected to the cam plate (2) and L-shaped link (7), and connected to the speed change link (12). The feedback gain of the feedback amount according to the axial displacement of the power roller due to the L-shaped link (7), is varied according to the gyration angle of the power roller.

5 Claims, 9 Drawing Sheets

SPEED CHANGE CONTROL SYSTEM OF TOROIDAL CONTINUOUSLY VARIABLE TRANSMISSION

FIELD OF THE INVENTION

The present invention relates to a speed change control system of a toroidal continuously variable transmission for vehicles, and in particular to a mechanism which feeds back the gyration angle of power rollers.

BACKGROUND OF THE INVENTION

A toroidal continuously variable transmission (CVT) for vehicles disclosed by JP-A-H10-148244 published by the Japanese Patent Office in 1998, and JP-A-H7-198015 published by the Japanese Patent Office in 1995, comprises a speed change control valve driven by an actuator and a feedback mechanism which feeds back the gyration angle of power rollers to the speed change control valve.

The actuator, speed change control valve and feedback mechanism are interconnected via a speed change link. The feedback mechanism comprises a precess cam connected to a trunnion supporting one of the power rollers, and a feedback link in contact with the precess cam joined to the speed change link.

The precess cam comprises a cam surface (or a cam groove) having a predetermined inclination (cam lead). The feedback link in contact with this cam surface combines a feedback amount according to the gyration angle of the power roller and a feedback amount according to the axial displacement of the trunnion, and transmits it to the speed change link.

SUMMARY OF THE INVENTION

In the above-mentioned conventional technique, the combining ratio of the feedback amount according to the gyration angle of the power roller and the feedback amount according to the axial displacement of the trunnion, is determined by the inclination of the cam surface or the cam groove of the precess cam. This inclination also determines the relation between the drive amount of the actuator which supplies a speed change command, and the variation of the gyration angle of the power roller (approximately equal to real speed ratio).

The axial displacement of the trunnion driven by a hydraulic cylinder is several millimeters, and therefore small. The speed change rate is determined by this axial displacement. To keep the speed change rate constant, it is necessary to increase the axial displacement amount as the speed ratio shifts to the Low side. This is because the peripheral speed of the input disk (speed of the power roller at the point of contact of the power roller and input disk) falls as the speed ratio shifts to the Low side, and the axial displacement amount of the trunnion must be increased to obtain a speed change rate equivalent to the High side. Here, the expression "the speed ratio is on the Low side" means the side on which the ratio of the output rotation speed to the input rotation speed of the transmission is small, and the speed ratio (reduction gear ratio) of the transmission is large. The expression "the High side" means the side on which the ratio of the output rotation speed to the input rotation speed of the transmission is large, and the reduction gear ratio of the transmission is small (hereafter idem).

The peripheral speed of the input disk is large on the High side and small on the Low side as described above, so to stabilize gyration angle control at all speed ratios, the inclination of the precess cam must be set small on the High side and set large on the Low side. In other words, the inclination of the precess cam must be varied nonlinearly.

However, when changing the inclination of a precess cam nonlinearly, the variation amount of the gyration angle relative to the drive amount of the actuator is small on the Low side and large on the High side. Therefore, the drive amount of the actuator which supplies the speed change command and the variation amount of the gyration angle are not in a directly proportional relation, i.e., the relation is nonlinear. If the relation between the drive amount of the actuator and the gyration angle is nonlinear, it will be necessary to compensate this nonlinear characteristic by a speed change controller using a map etc., the size of the program will increase, and the capacity of the memory required to store it will also increase.

Further, if the precess cam is assembled in the trunnion with a positional error in the rotating direction, the above-mentioned compensation by the controller will not be performed correctly at all speed ratios, and the precision of speed change control will fall.

It is therefore an object of this invention to make the relation between the drive amount of an actuator and the variation of a power roller gyration angle proportional, and make the feedback amount according to the axial displacement of the trunnion an optimal amount according to the gyration angle of the power roller.

In order to achieve above object, this invention provides a speed change control system which controls a speed ratio of a toroidal transmission including a power roller gripped between an input disk and an output disk, a trunnion which supports the power roller rotatably and displaces in the axial direction, and a fluid pressure cylinder which drives the trunnion in the axial direction. The control system comprises a speed change control valve which controls the fluid pressure supplied to the fluid pressure cylinder, a speed change link, an actuator which drives the speed change control valve via the speed change link, a first feedback mechanism which generates a first feedback amount according to the gyration angle of the power roller, a second feedback mechanism which generates a second feedback amount according to the axial displacement of the power roller and varies a feedback gain according to the gyration angle of the power roller, and a feedback link connected to the first and second feedback mechanisms, which combines the first and second feedback amounts and transmits the combined amount to the speed change control valve via the speed change link.

The details as well as other features and advantages of this invention are set forth in the remainder of the specification and are shown in the accompanying drawings.

BRIEF DESCRIPTION OF THE DRAWINGS

FIGS. 4A, 4B are side views of an L-shaped link. FIG. 4A shows the state where the gyration angle of the power roller is on the High side, and FIG. 4B shows the state where the gyration angle of the power roller is on the Low side.

FIGS. 5A, 5B and 5C are plan views showing a relation between a cam plate and a feedback link. FIG. 5A shows the state when the gyration angle of a power roller has varied from the state shown in FIG. 5B to the Low side. FIG. 5B shows the state corresponding to FIG. 2. FIG. 5C shows the state when the gyration angle of the power roller has varied from the state shown in FIG. 5B to the High side.

DESCRIPTION OF THE PREFERRED EMBODIMENTS

Figure 1:
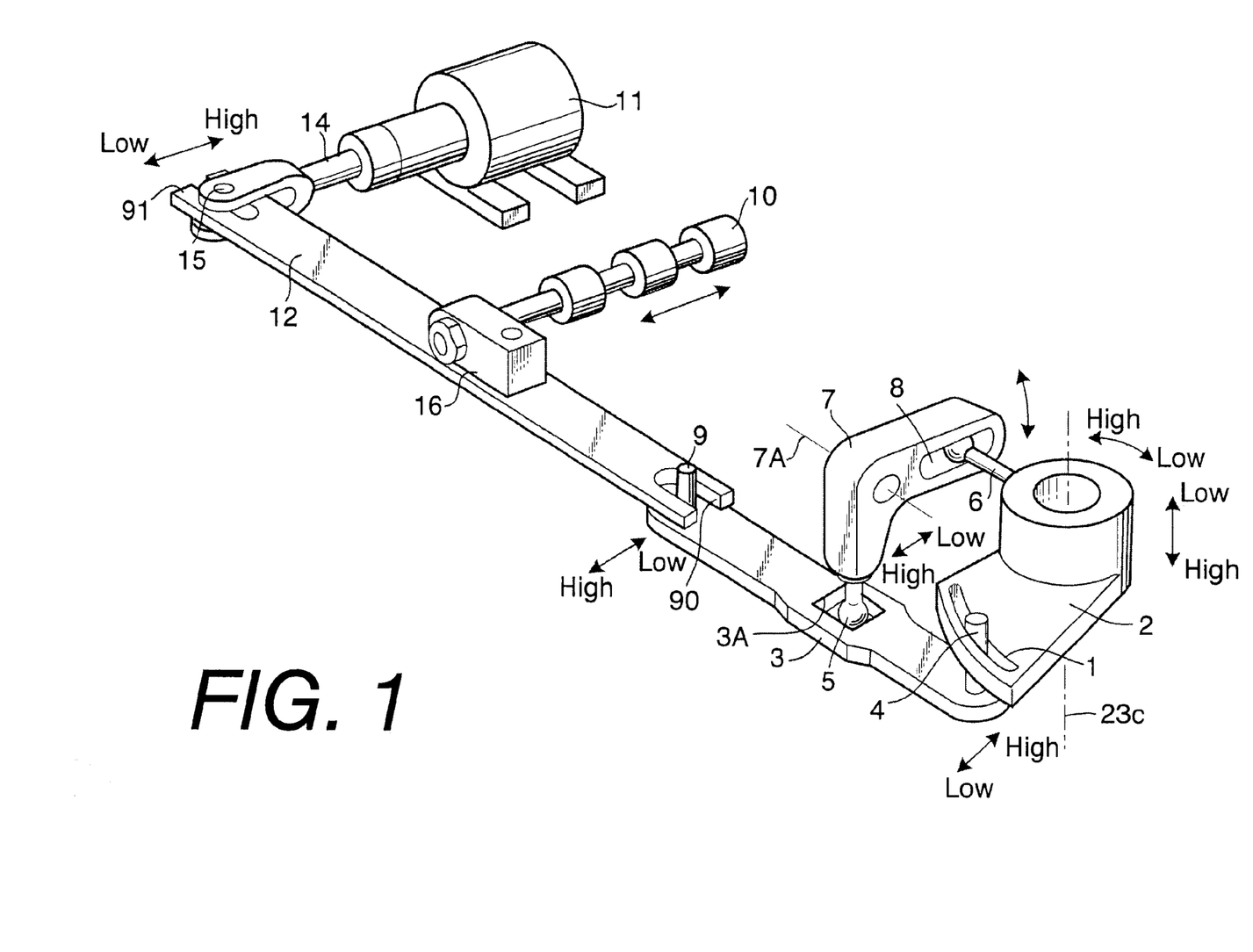
FIG. 1 is a schematic perspective view showing a speed change control mechanism of a toroidal continuously variable transmission relating to this invention.
Figure 2:
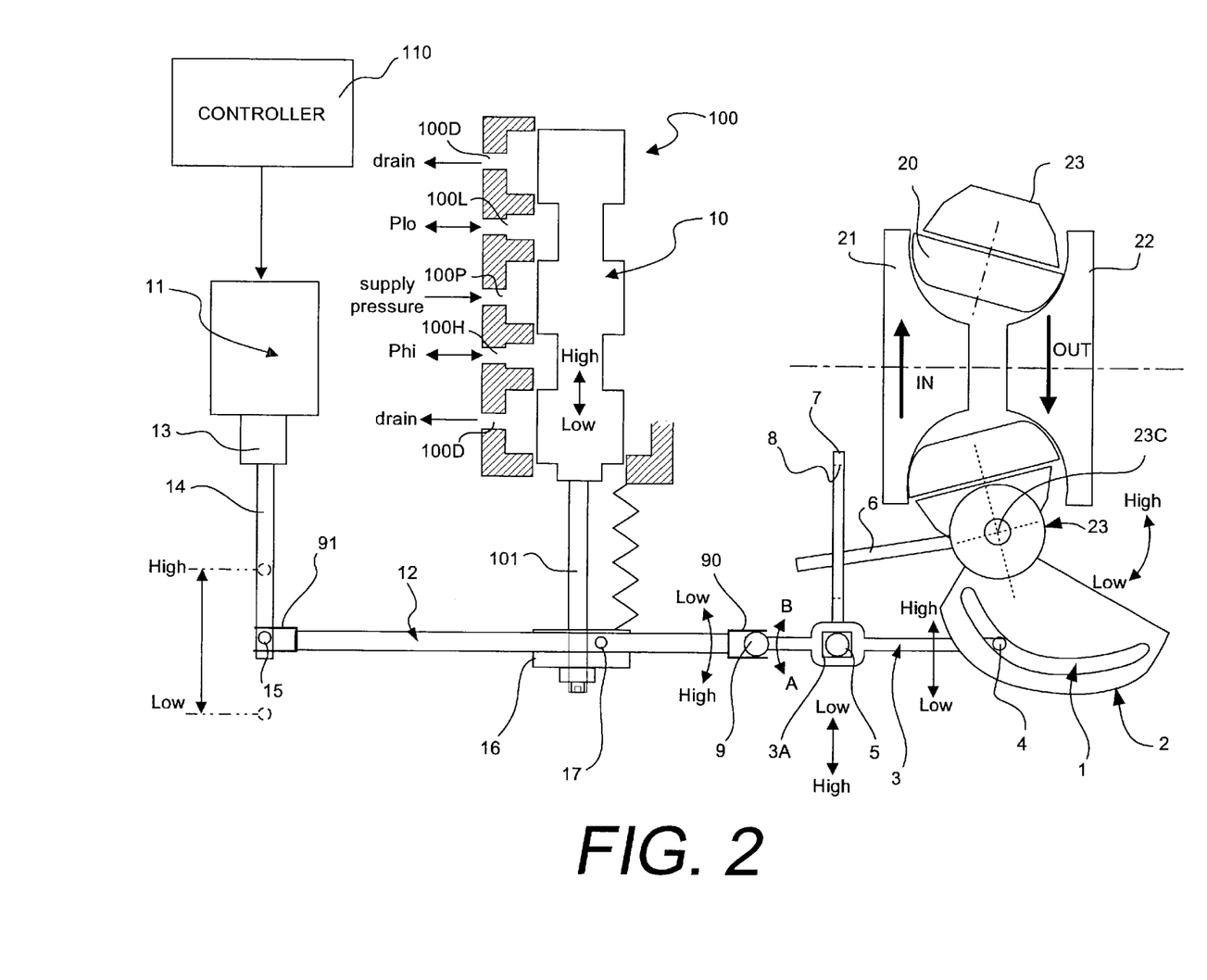
FIG. 2 is a plan view of the speed change control mechanism.
Figure 3:
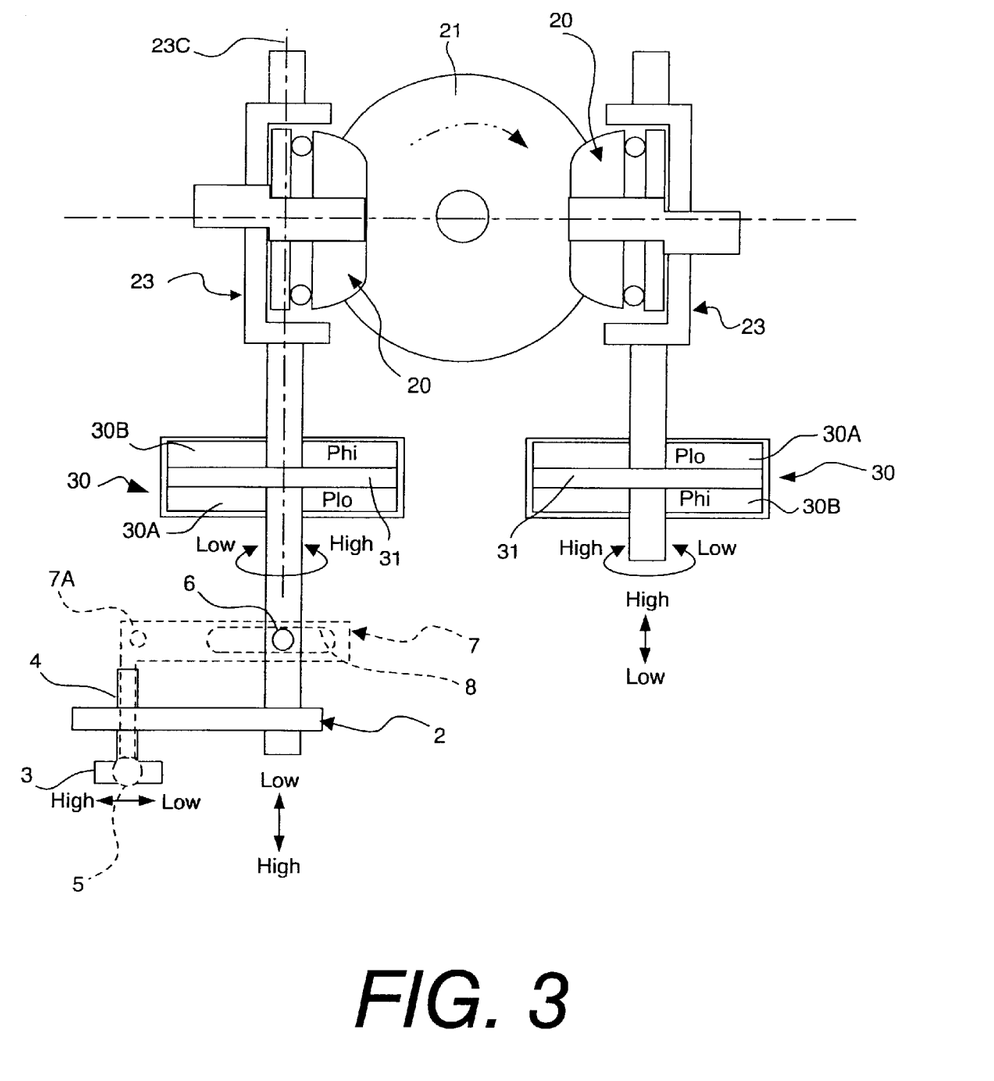
FIG. 3 is a schematic view of the toroidal continuously variable transmission.

Referring to FIG. 1–FIG. 3 of the drawings, a speed change control mechanism of a half toroidal continuously variable transmission (CVP) is equipped with a step motor 11 and a speed change control valve 100. The step motor 11 drives a spool 10 of the speed change control valve 100 via a speed change link 12 according to the command of a controller 110.

The gyration angle of a power roller 20 (=rotation angle of a trunnion 23 which supports the power roller 20), and the axial displacement of the trunnion 23, are fed back to the spool 10 via the speed change link 12. As the axial displacement of the trunnion 23 is substantially equal to the axial displacement of the power roller 20, the axial displacement of the power roller 20 is fed back to the spool 10 via the speed change link 12. An engaging slot 91 is formed at one end of the speed change link 12, and a pin provided on a slider 14 driven in the axial direction by the step motor 11 via a reduction gear mechanism 13, engages with the engaging slot 91.

As shown in FIG. 1 and FIG. 2, a rod 101 of the spool 10 of the speed change control valve 100 is connected via a pin 17 of a connecting member 16 to the speed change link 12.

As shown in FIG. 2 and FIG. 3, the speed change control valve 100 comprises a port 100L communicating with an oil chamber 30A of an oil pressure cylinder 30 which drives the trunnion 23 in the axial direction, a port 100H communicating with an oil chamber 30B of the oil pressure cylinder 30, a port 100P communicating with an oil pressure supply source formed between these ports 100L, 100H, and drain ports 100D, 100D disposed next to the ports 100L, 100H respectively, and communicating with a drain.

When the supply pressure of the port 100P is supplied to one oil chamber 30A (or 30B) according to the displacement of the spool 10, and the other oil chamber 30B (or 30A) is connected to the drain, the differential pressure between the oil pressure acting on one surface of a piston 31 and the oil pressure acting on the other surface of the piston 31 is changed, the trunnion 23 will be driven in the axial direction and the power roller 20 will gyrate.

The positions of the oil chambers 30A, 30B of the hydraulic cylinders 30, 30 which drive the facing trunnions 23, 23 are opposite to one another, as shown in FIG. 3.

Therefore, when the oil pressure Plo from the port 100L rises, the trunnion 23 on the left-hand side of the figure moves up, the trunnion 23 on the right-hand side of the figure descends, and when the input disk 21 rotates, the power rollers 20 gripped between the input disk 21 and output disk 22 gyrate to the Low side of the speed ratio, as shown in FIG. 3. Conversely, when the oil pressure Phi from the port 100H rises, the trunnion 23 on the left-hand side of the figure descends, the trunnion 23 on the right-hand side of the figure moves up, and the power rollers 20 gyrate to the High side of the speed ratio.

Next, the feedback mechanism which feeds the gyration angle of the power roller 20 and the axial displacement of the trunnions 23 back to the speed change control valve 100, will be described.

An engaging slot 90 is formed at the end of the speed change link 12, on the opposite side to the end connected with the step motor 11. A pin 9 provided at one end of the feedback link 3 engages with the engaging slot 90.

A cam plate 2 for feeding the gyration angle of the power roller 20 (=rotation angle of the trunnion 23) back to the speed change control valve 100, and an arm 6 for feeding the axial displacement of the trunnions 23 back to the speed change control valve 100, are formed in the lower part of the trunnion 23 which supports the power roller 20.

A slit 1 whereof the distance from a shaft 23C of the trunnion 23 varies according to the gyration angle of the power roller 20, is formed in the cam plate 2, a pin 4 provided at the end of the feedback link 3 passing through this slit 1. An E-shaped ring or the like, not illustrated, is attached to the pin 4, and the feedback link 3 and cam plate 2 are thereby connected.

The shape of the slit 1 is set such that the distance from the shaft 23C varies according to the gyration angle, and the drive amount of the step motor 11 is directly proportional to the variation amount of the gyration angle of the power roller 20. The shape of the slit 1 may also be set so that the speed ratio is directly proportional to the drive amount of the step motor 11.

A hole 3A which serves as a pivot point of the feedback link 3 when the gyration angle is fed back by the slit 1, is formed in the middle of the feedback link 3 (between the pin 4 and pin 9). A ball 5 formed at one end of an L-shaped link 7, engages with the hole 3A to feed back the axial displacement of the trunnions 23.

The L-shaped link 7, which feeds back the axial displacement of the trunnions 23, is supported free to pivot around a shaft 7A substantially perpendicular to the shaft 23C of the trunnion 23 and substantially parallel to the longitudinal direction of the feedback link 3, as shown in FIG. 1 and FIG. 3.

A slit 8 is formed in a side face of the L-shaped link 7. The arm 6 projecting from the trunnion 23 engages with the slit 8 and contacts with the L-shaped link 7 in the axial direction of the trunnion 23. The feedback link 3 is driven via the ball 5 according to the axial displacement of the trunnion 23 (axial displacement amount feedback).

Figure 4A:
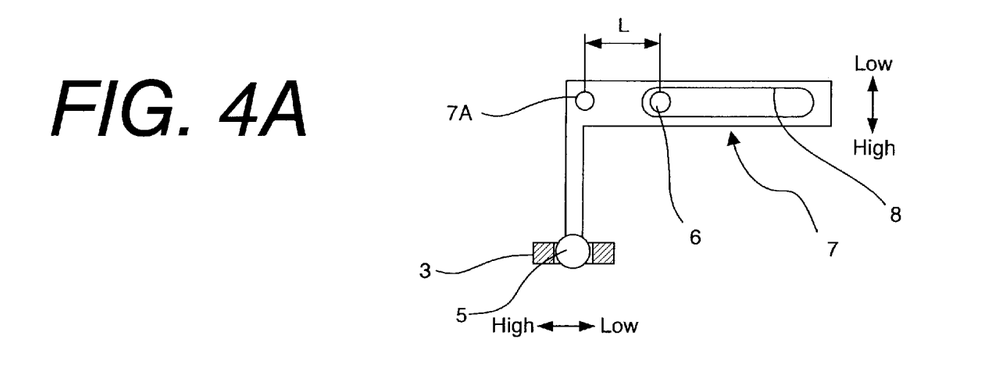
Figure 4B:
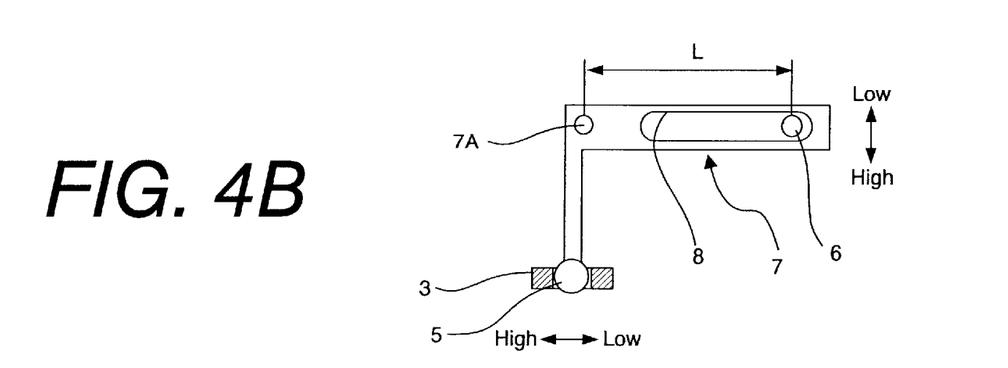

The slit 8 of the L-shaped link 7 has sufficient length so as not to interfere with the displacement of the arm 6 even if the speed ratio is a maximum or a minimum, as shown in FIG. 1, FIG. 4A and FIG. 4B, and the contact point where the arm 6 and L-shaped link 7 come in contact changes according to the gyration angle of the power roller 20 so as to vary a lever ratio. The lever ratio is a ratio of an output displacement to an input displacement of a lever, which here is the ratio of the displacement amount of the feedback link 3 (or ball 5) to the axial displacement amount of the trunnion 23 (or arm 6) input to the L-shaped link 7.

Specifically, as shown in FIG. 4A, when the gyration angle of the power roller 20 is on the High side, the arm 6 is situated on the left-hand side of the figure, and the distance L from the point where the arm 6 and L-shaped link 7 come in contact to the shaft 7A becomes short. On the other hand, as shown in FIG. 4B, when the gyration angle of the power roller 20 is on the Low side, the arm 6 is situated on the right-hand side of the figure, and the distance L from the point where the arm 6 and L-shaped link 7 come in contact to the shaft 7A becomes long.

Therefore, when the gyration angle is on the High side, the displacement amount of the feedback link 3 relative to the axial displacement amount of the trunnion 23, increases (large lever ratio). On the other hand, when the gyration angle is on the Low side, the displacement amount of the feedback link 3 relative to the axial displacement amount of the trunnion 23, decreases (small lever ratio).

In other words, due to the combination of the slit 8 of the L-shaped link 7 and the arm 6, the feedback gain of the axial displacement amount feedback is varied according to the gyration angle. When the gyration angle is on the High side, the feedback gain is large, and when the gyration angle is on the Low side, the feedback gain is small.

Due to the slit 1 formed in the cam plate 2 and the pin 4 of the feedback link 3, the pin 9 of the feedback link 3 displaces relative to the gyration angle of the power roller 20 (gyration angle feedback). The feedback gain in this gyration angle feedback does not depend on the gyration angle, but is effectively fixed.

Figure 5A:
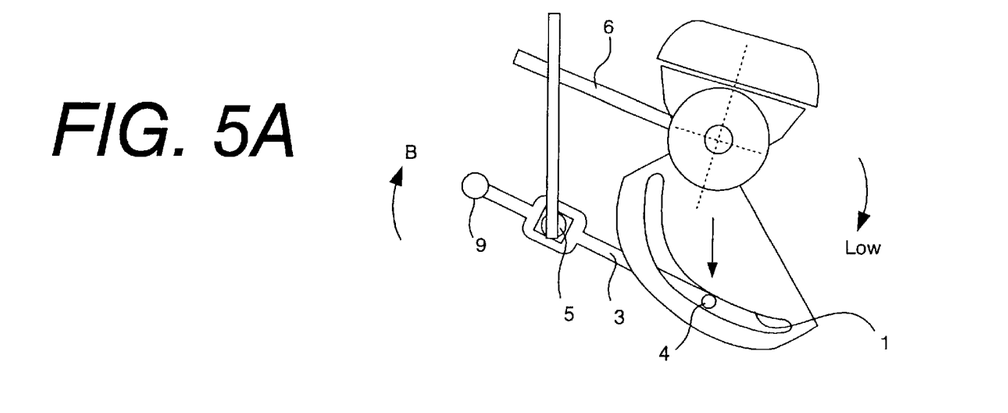
Figure 5B:
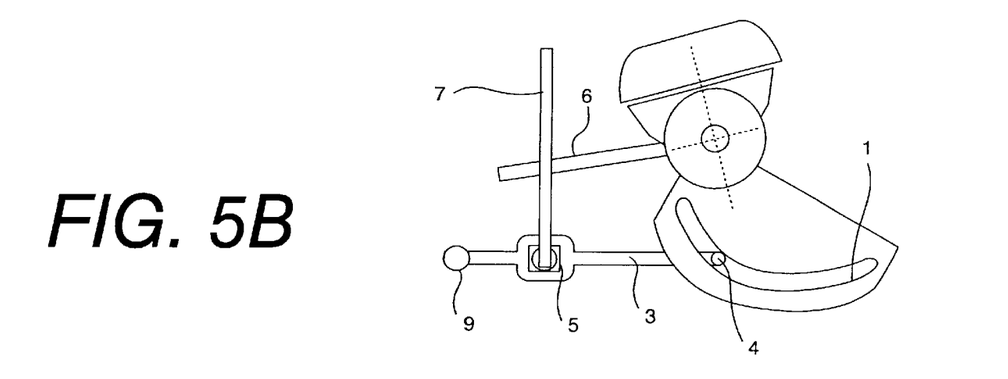

If FIG. 5B is the state corresponding to FIG. 2, when the gyration angle shifts from FIG. 5B to the Low side due to change of transmission input torque, etc., the pin 4 which engaged with the slit 1 displaces downwards as shown in FIG. 5A, and the feedback link 3 rotates clockwise around the ball 5 of the L-shaped link 7. Therefore, the pin 9 displaces in the direction B in the figure, and drives the spool 10 upwards in FIG. 2. Due to this, the port 100P and port 100H communicate, and the port 100L communicates with the drain. An oil pressure in a direction returning the speed ratio to the High side, then acts on the trunnion 23, and the gyration angle (speed ratio) set by the step motor 11 is maintained.

Figure 5C:
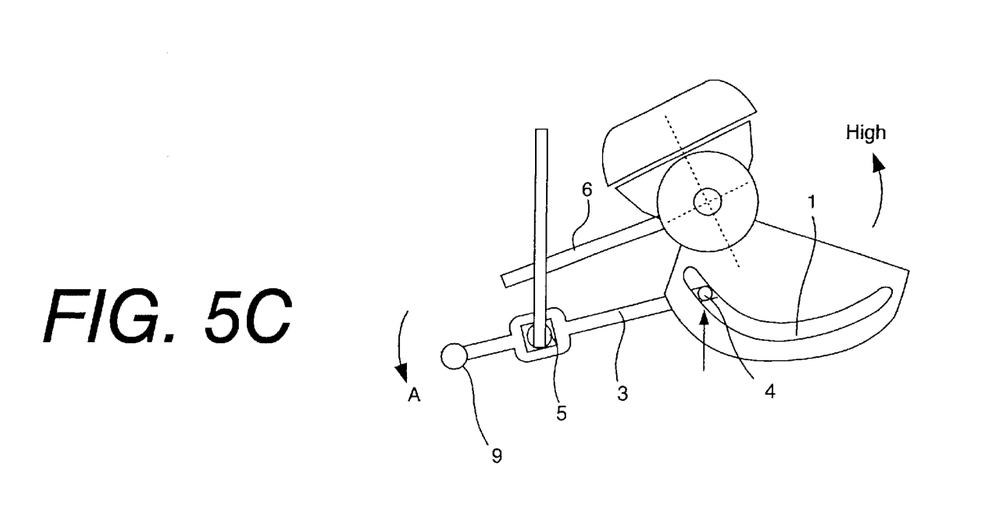

Conversely, when a coasting torque, etc., is input, if the gyration angle varies from FIG. 5B to the High side, the pin 4 engaged with the slit 1 displaces upwards as shown in FIG. 5C, and the feedback link 3 rotates counterclockwise around the ball 5 of the L-shaped link 7. Therefore, the pin 9 displaces in the direction A in the figure, and drives the spool 10 downwards in FIG. 2. Due to this, the port 100P and port 100L communicate, and the port 100H communicates with the drain. An oil pressure returning the speed ratio to the Low side acts on the trunnion 23, and the gyration angle (speed ratio) set by the step motor 11 is maintained.

As described above, according to this invention, a feedback amount according to the rotation angle of the trunnion 23, generated by a feedback mechanism (first feedback mechanism) comprising the cam plate 2 with the slit 1 and the pin 4 which engages with the slit 1, and a feedback amount according to the axial displacement amount of the trunnion 23, generated by a feedback mechanism (second feedback mechanism) comprising the L-shaped link 7 with the slit 8 and the arm 6 which engages with the slit 8, are combined in the feedback link 3. This combined feedback amount is transmitted to the speed change control valve 100 via the speed change link 12. Whereas the feedback gain of the first feedback mechanism is effectively fixed irrespective of the rotation angle of the trunnion 23, the feedback gain of the second feedback mechanism is varied according to the rotation angle of the trunnion 23, and the feedback gain decreases as the speed ratio of the transmission increases.

Therefore, the feedback gain can be changed appropriately according to the rotation of the trunnion 23, i.e., according to the gyration angle of the power roller 20, when the axial displacement of the trunnion 23 is fed back, while maintaining a substantially directly proportional relation of the gyration angle of the power roller 20 to the drive amount of the step motor 11, and good response and stability are ensured at all speed ratios.

As there is no need to compensate a nonlinear relation as in the prior art, the program size is small, and the amount of memory required to store the program can be reduced. Moreover, the control logic can be simplified.

Figure 6:
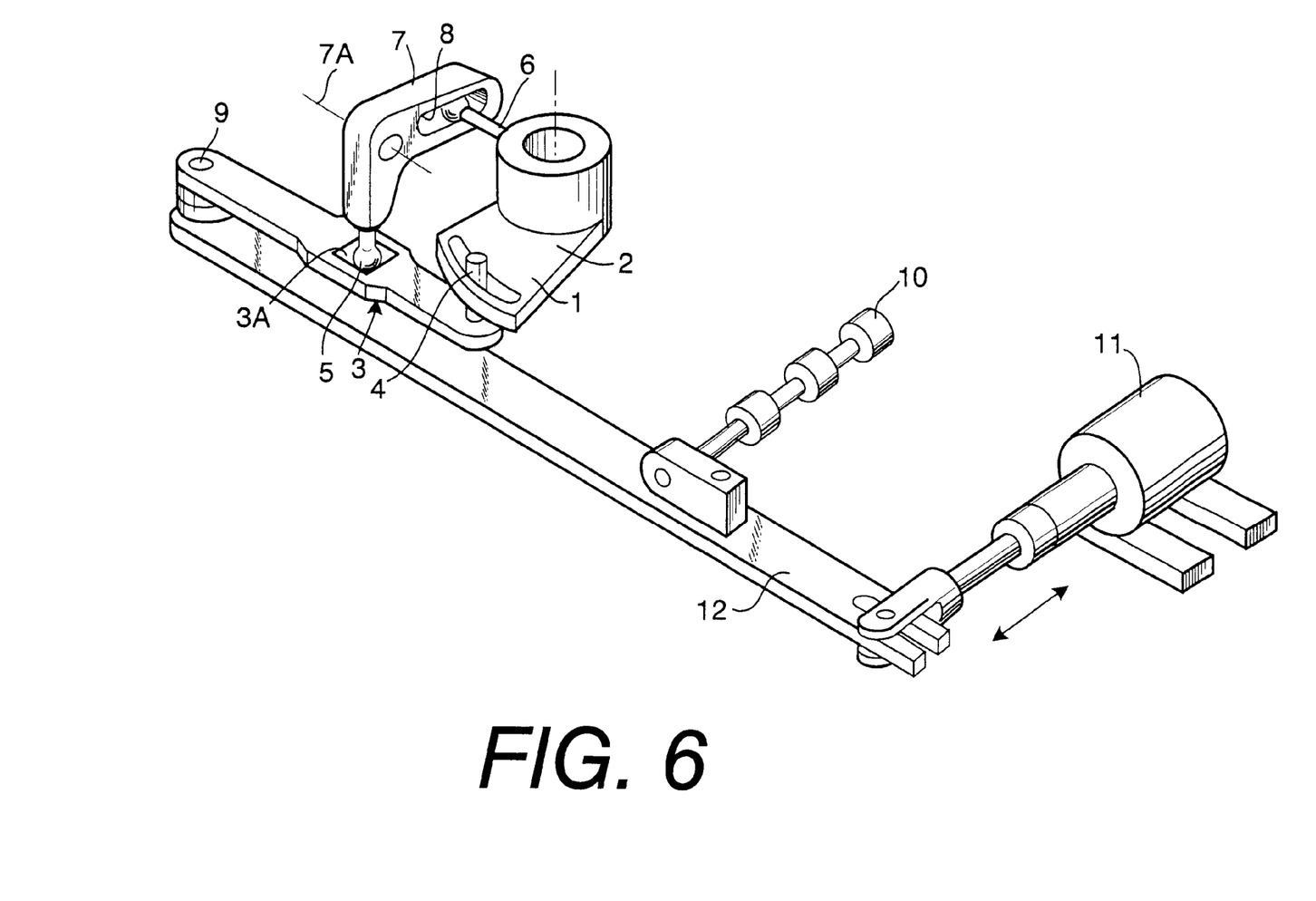
FIG. 6 is similar to FIG. 1, but showing a second embodiment of this invention.

FIG. 6 shows a second embodiment of this invention.

In the second embodiment, the positions of the feedback mechanism and the step motor 11 are reversed, the feedback link 3 is arranged over the speed change link 12, and the cam plate 2 and L-shaped link 7 are provided near the speed change control valve 100. The remaining features and operation are the same as that of the first embodiment.

In the first embodiment, the feedback link 3 was disposed on the outside of the speed change link 12. However, in this second embodiment, the feedback link 3 and the end of the speed change link 12 are connected by the pin 9, and the feedback link 3 is disposed over the feedback link 12, so the cam plate 2 and L-shaped link 7 can be arranged nearer the speed change control valve 100, as shown in FIG. 6.

Therefore, if sufficient space for the whole length of the speed change link 12 is provided, the step motor 11, the speed change control valve 100 and the feedback mechanism can be arranged, and the speed change control mechanism can be made more compact than that of the first embodiment.

In the above-mentioned embodiments, the positional order of the feedback mechanism, step motor 11 and speed change control valve 100 is not limited to the order in the embodiments, and these can be arranged in any order.

Moreover, although the pin 4 was provided at the end of the feedback link 3 and the L-shaped link 7 connected to the part between the pin 4 and pin 9, the L-shaped link 7 may be connected with the end of the feedback link 3. In this case, the pin 4 is formed between the L-shaped link 7 and pin 9, and the pin 4 is made to engage with the slit 1 of the cam plate 2.

Figure 7:
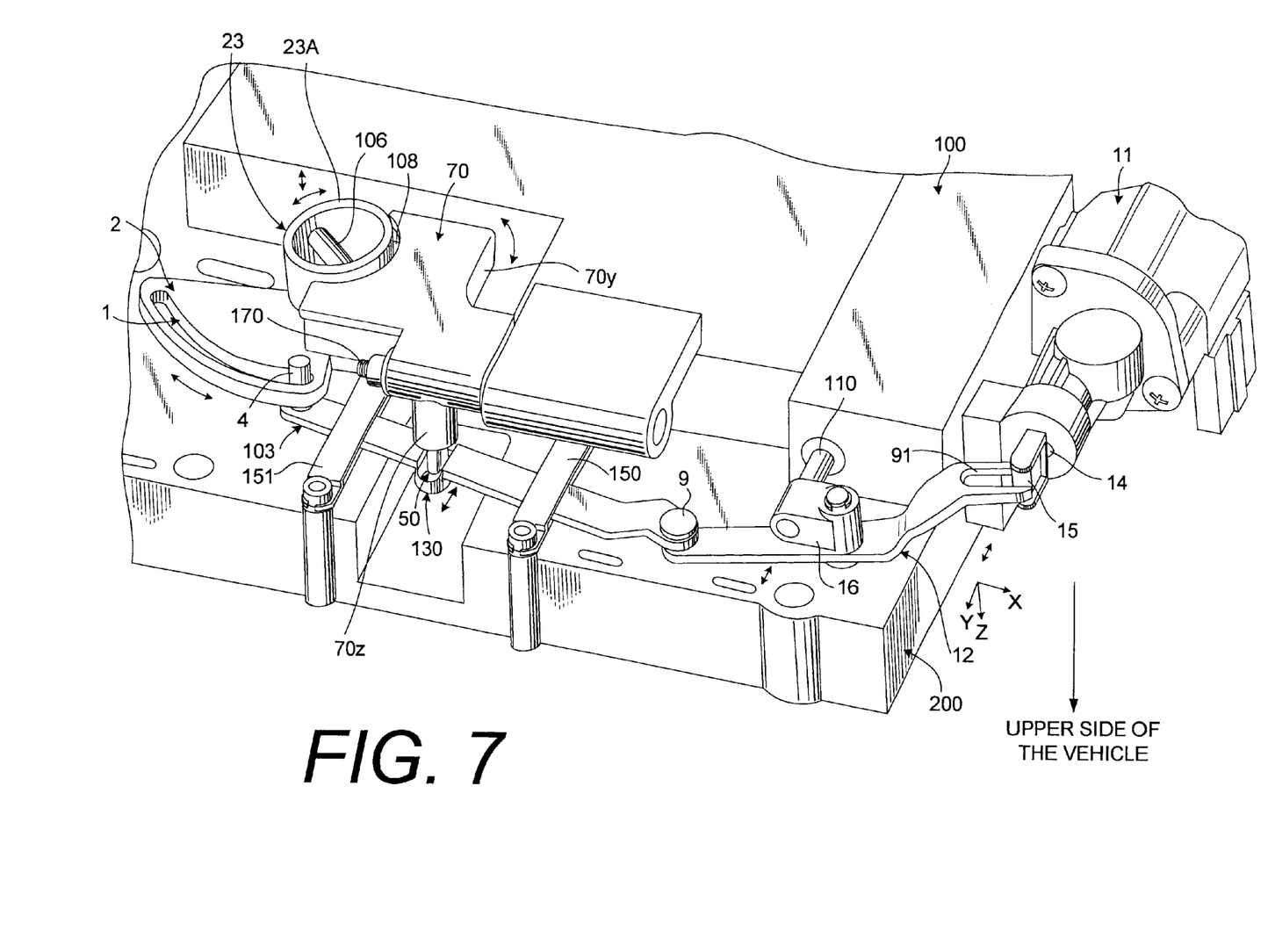
FIG. 7 is a perspective view of the speed change control mechanism according to a third embodiment, showing from the lower side of the transmission.
Figure 8:
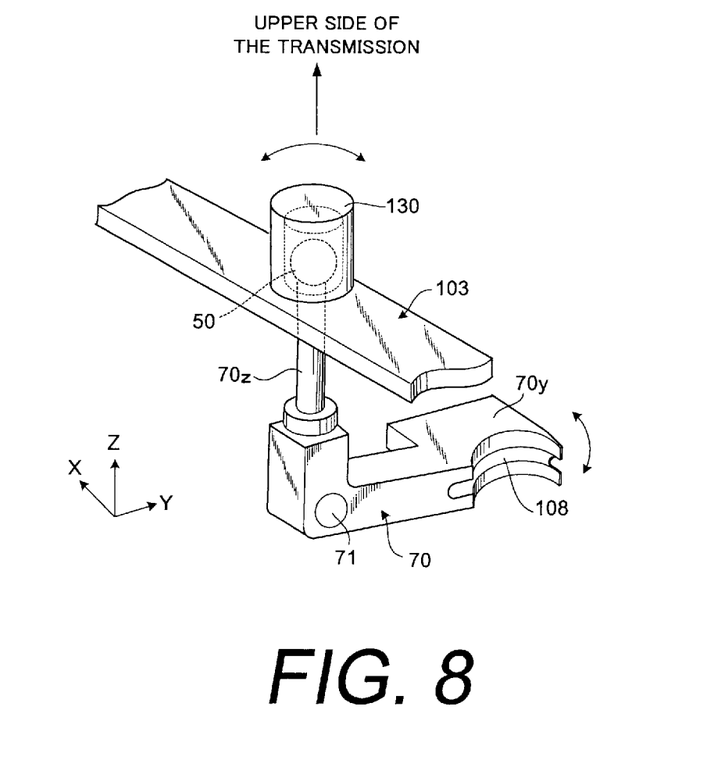
FIG. 8 is a schematic perspective view of the engaging part of the feedback link and speed change link viewed obliquely from above.
Figure 9:
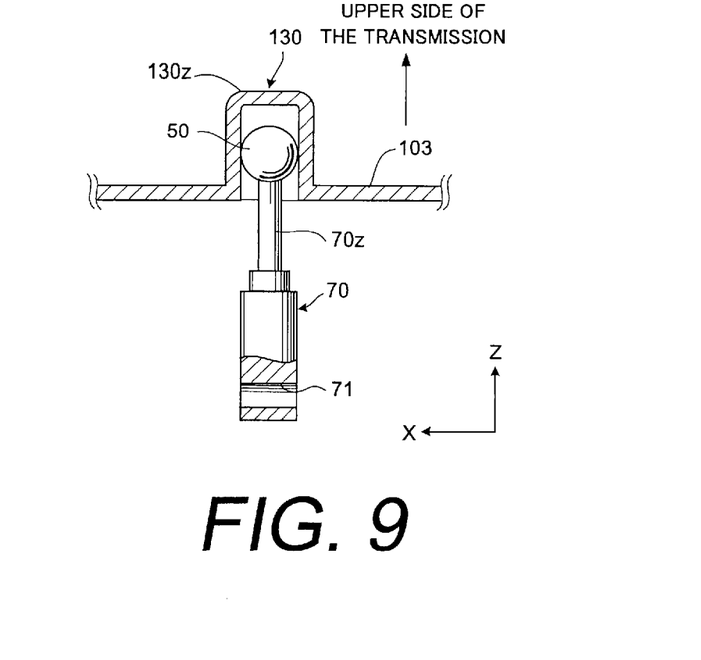
FIG. 9 is a schematic cross-sectional view of an engaging position of the feedback link and speed change link.

FIG. 7–FIG. 9 show a third embodiment.

FIG. 7 shows a speed change control mechanism installed on the undersurface of a valve body 200 of the transmission viewed from the base of the transmission (viewed from the oil pan side).

The X axis in the figure is the front/rear direction of the vehicle body, the Y axis is the transverse direction of the vehicle body, and the Z axis direction is the vertical direction of the vehicle. The lower side of the figure is the upper side of the vehicle.

The third embodiment differs from the first embodiment in that the ball of the L-shaped link is joined with the feedback link not through the hole 3A, but via a cylindrical cap 130 having a base. The remaining features of the construction are essentially identical to those of the first embodiment, and identical numbers are assigned.

In FIG. 7, the cylindrical cap 130 with a base is installed on the feedback link 103 which combines a feedback amount according to the gyration angle of the power roller 20 and a feedback amount according to the axial displacement of the trunnion 23, at the position of the hole 3A of the first embodiment. The cylindrical cap 130 has a base 130z oriented towards the upper part of the transmission, and is arranged perpendicular to the longitudinal direction and pivot direction of the feedback link 103, i.e., it is arranged perpendicular to the surface on which the feedback link 103 moves.

In this embodiment, the center axis of the cap 130 is parallel to the Z axis, but when the transmission is mounted at a slant to the vehicle body, it may be arranged at a slant relative to the Z axis.

As shown also in FIG. 8 and FIG. 9, a ball 50 provided at the end of an L-shaped link 70 is joined to the inner circumference of the cap 130. In this way, the axial displacement of the trunnion 23 is transmitted to the feedback link 103, as in the first embodiment.

In order to transmit the movement of the L-shaped link 70 correctly, it is necessary to make the gap between the inner circumference 130a and the ball 50 as small as possible.

However, if contaminant in the oil is introduced, frictional resistance between this ball 50 and the inner circumference 130a increases, and smooth movement of the L-shaped link 70 and the feedback link 103 will be prevented.

Hence, according to this embodiment, the base 130z of the cap 130 is formed on the upper side of the transmission, and this side of the cap 130 is closed by the base 130z. In this way, oil dripping towards the oil pan, not shown, from the upper part of the transmission is prevented from directly splashing on the ball 50, contaminants are prevented from clogging the gap between the ball 50 and inner circumference 130a, and the relative displacement of the L-shaped link 70 and feedback link 103 is always smooth.

Although the construction of the L-shaped link 70 and feedback link 103 is fundamentally the same as that of the first embodiment, there are some differences.

An arc-shaped groove 108 as shown in FIG. 7 and FIG. 8 is formed in the L-shaped link 70 instead of the slit 8 of the first embodiment, and the end of the arm 106 which protrudes from the trunnions 23 slides in the groove 108. In FIG. 7, the arm 106 is arranged so that it penetrates the lower part 23A of the trunnion 23, which is formed in a cylindrical shape, in the direction of the diameter.

The L-shaped link 70 comprises a plate-shaped part 70y extending in the Y axis direction and a rod-shaped part 70z projecting in the Z axis direction. The L-shaped link 70 is supported by a pivot shaft 170 in a throughhole 71 along the X axis in the figure. The side face of the plate-shaped part 70y on the side of the trunnion 23 is formed so that it surrounds the trunnion 23, and the groove 108 is formed in the side face. The pivot shaft 170 is supported by the valve body 200.

The ball 50 is fixed at the end of the rod-shaped part 70z. The ball 50 engages with the inner circumference of the cap 130, the axial displacement of the trunnion 23 being transmitted to the feedback link 103 via the ball 50 and the cap 130.

As shown in FIG. 7, sliders 150, 151 which support the feedback link 103 from the oil pan side (lower side of vehicle body) such that it is free to slide, are arranged in the valve body 200 on either side of the connecting position of the feedback link 103 and the L-shaped link 70.

The height of the cap 130 which slides with the ball 50 on the inner circumference 130a, may be set according to the pivot amount of the L-shaped link 70.

Specifically, in FIG. 7–FIG. 9, when the L-shaped link 70 rotates around the pivot shaft 170, the slide contact position in the Z axis direction between the ball 50 and inner circumference 130a varies, so the height of the cap 130 is set according to the axial displacement of the ball 50 in the Z axis direction determined according to the axial displacement of the trunnion 23 and the lever ratio of the L-shaped link 70.

The cap 130 which engages with the ball 50 of the L-shaped link 70 is attached to the feedback link 103 with its base 130z oriented towards the upper side of the transmission, so dripping of oil from the upper part of the transmission over the ball 50 is suppressed. Thus, contaminants in the oil are prevented from clogging the gap between the ball 50 and inner circumference 130a, and the feedback link 103 and L-shaped link 70 can be operated smoothly.

The cap 130 on which the ball 50 slides can be formed in one piece with the feedback link 103, but it may first be formed separately from the feedback link 103, and then fixed to the feedback link 130 by press fitting or welding.

Figure 10:
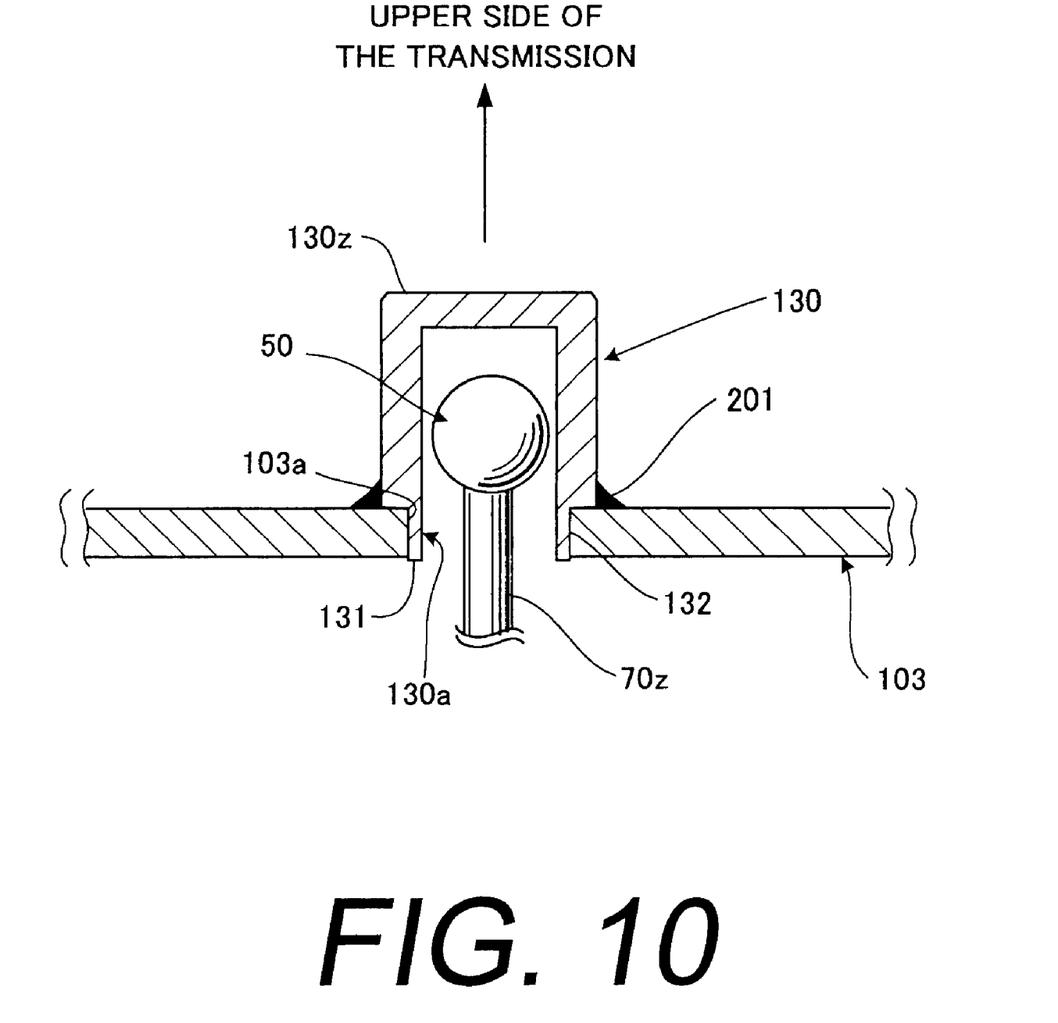
FIG. 10 is a schematic sectional view of the engaging position of the feedback link and speed change link according to another embodiment.

For example, as shown in FIG. 10, a step 132 is formed on the side of the opening of the cap 130, and the cap 130 then pressed into the throughhole 103a in the feedback link 103 from this step 132 up to an end 131. The outer circumference of the step 132 is also welded to the feedback link 103. A numeral 201 in the figure is the weld bead 201. Thereby, the feedback link 103 and the cap 130 are firmly joined. Compared with the case where the cap 130 is formed in one piece with the feedback link 130, manufacture is easy and manufacturing cost can be reduced.

An example was shown where the cap 130 was provided with the base 130z, but the cap 130 may also be a simple cylinder without a base. In this case also, oil is prevented from reaching the ball 50 and inner circumference 130a from the side direction.

The entire contents of Japanese Patent Applications P2000-141359 (filed May 15, 2000) and P2001-64352 (filed Mar. 8, 2001) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A speed change control system which controls a speed ratio of a toroidal transmission including a power roller gripped between an input disk and an output disk, a trunnion which supports the power roller rotatably and displaces in the axial direction, and a fluid pressure cylinder which drives the trunnion in the axial direction, the control system comprising:
   a speed change control valve which controls the fluid pressure supplied to the fluid pressure cylinder;
   a speed change link;
   an actuator which drives the speed change control valve via the speed change link;
   a first feedback mechanism which generates a first feedback amount according to the gyration angle of the power roller;
   a second feedback mechanism which generates a second feedback amount according to the axial displacement of the power roller and varies a feedback gain for the second feedback amount according to the gyration angle of the power roller; and a feedback link connected to the first and second feedback mechanisms, which combines the first and second feedback amounts and transmits the combined amount to the speed change control valve via the speed change link, wherein the second feedback mechanism varies the feedback gain so that the feedback gain becomes smaller as the speed ratio of the transmission increases.

2. A speed change control system as defined in claim 1, wherein the first feedback mechanism moves the feedback link so that a distance from a shaft of the trunnion varies according to the gyration angle of the power roller.

3. A speed change control system as defined in claim 1, wherein the second feedback mechanism comprises a link into which the axial displacement of the power roller is input, and which varies a lever ratio according to the gyration angle of the power roller, one end of the link being connected to the feedback link.

4. A speed change control system as defined in claim 1, wherein:

the second feedback mechanism further comprises:
a link supported free to pivot, into which the axial displacement of the power roller is input,
a spherical part provided at one end of the link, and
a cylindrical member provided on the feedback link such that it is perpendicular to the surface on which the feedback link moves, and which engages with the spherical part.

5. A speed change control system as defined in claim 4, wherein the vehicle body upper side of the cylindrical member is closed.

* * * * *